Figure 1:
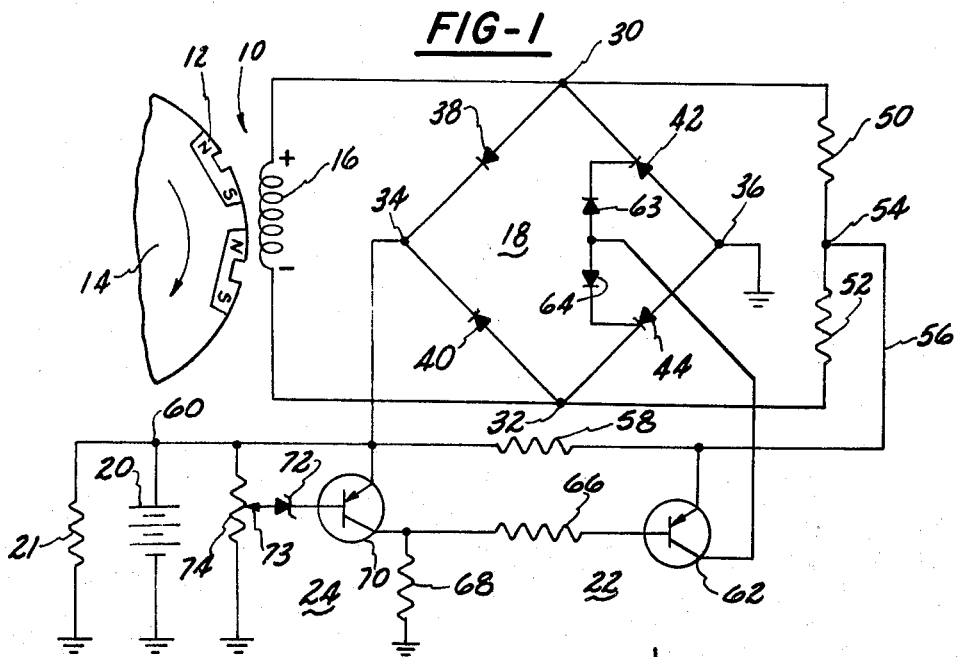

United States Patent [19]
Farr

[11] 4,146,831
[45] Mar. 27, 1979

[54] REGULATED RECTIFIER FOR ALTERNATOR-SUPPLIED BATTERY CHARGER

[75] Inventor: James B. Farr, Ann Arbor, Mich.

[73] Assignee: Tecumseh Products Company, Tecumseh, Mich.

[21] Appl. No.: 664,825

[22] Filed: Mar. 8, 1976

Related U.S. Application Data

[63] Continuation of Ser. No. 363,724, May 24, 1973, abandoned, which is a continuation of Ser. No. 194,729, Nov. 1, 1971, abandoned.

[51] Int. Cl.² .............................................. H02J 7/14
[52] U.S. Cl. ...................................... 322/94; 320/39; 320/70; 320/DIG. 2
[58] Field of Search .................... 320/DIG. 2, 39, 40, 320/70, 57, 59; 322/90, 94

[56] References Cited

U.S. PATENT DOCUMENTS

| | | | |
|---|---|---|---|
| 3,300,704 | 1/1967 | McMillen | 320/40 X |
| 3,305,755 | 2/1967 | Walsh | 320/DIG. 2 |
| 3,382,425 | 5/1968 | Legatti | 320/DIG. 2 |
| 3,437,905 | 4/1969 | Healy et al. | 320/DIG. 2 UX |
| 3,439,253 | 4/1969 | Piteo | 320/40 X |

Primary Examiner—Robert J. Hickey
Attorney, Agent, or Firm—Albert L. Jeffers; Roger M. Rickert

[57] ABSTRACT

A permanent magnet alternator is connected directly across the battery through a full-wave bridge rectifier. The bridge includes a pair of controlled rectifiers which are selectively rendered conductive to charge the battery through the bridge when the battery voltage drops below a preset value. A Zener diode and one transistor monitor the battery voltage and control a second transistor which in turn controls gating current from the alternator to the controlled rectifiers.

30 Claims, 4 Drawing Figures

INVENTOR
JAMES B. FARR
BY
Barnes Kisselle Raisch & Choate
ATTORNEYS

REGULATED RECTIFIER FOR ALTERNATOR-SUPPLIED BATTERY CHARGER

This is a continuation of application Ser. No. 363,724, filed May 24, 1973, now abandoned which in turn is a continuation of application Ser. No. 194,729, filed Nov. 1, 1971 (now abandoned).

Permanent magnet alternators are known to provide numerous advantages with electrical systems of a vehicle or the like. Various regulated rectifier circuits have been proposed for use with an alternator, particularly for automotive applications. However, these regulated rectifiers are not, in general, particularly suited for alternators of the type used with small engines, for example, flywheel alternators used with single or two cylinder engines. Small engine competition demands low cost, simple construction and reliable operation.

Among the objects of the present invention are to provide a regulated rectifier that is particularly suited for charging a battery from a permanent magnet alternator; that is particularly suited for such application with small engines; that provides a high degree of regulation that does not change significantly with engine speed; that is constructed economically and yet provides reliable operation; that protects components that might otherwise be damaged by improper connection of the battery leads and protects electrical loads against damage from over-voltage when the battery is disconnected; that has minimum current draw from the battery when the engine is not operating; and/or that effectively regulates battery charging from a permanent magnet alternator source over a wide variety of operating conditions.

Figure 2:
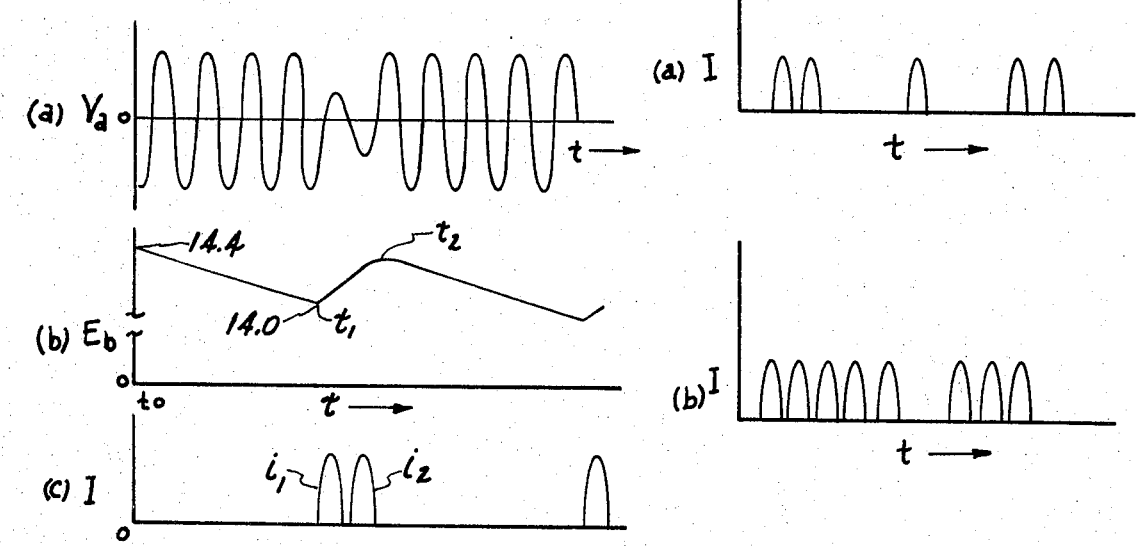
Figure 3:
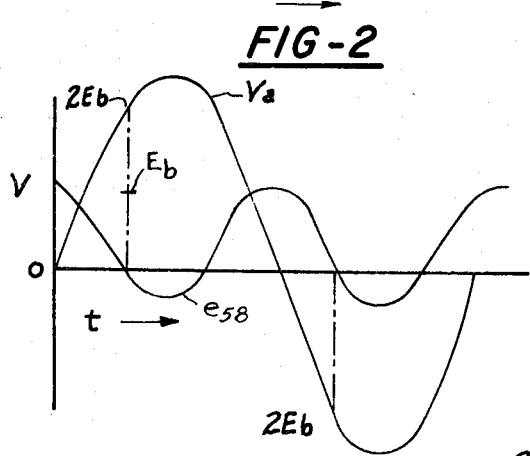
Figure 4:
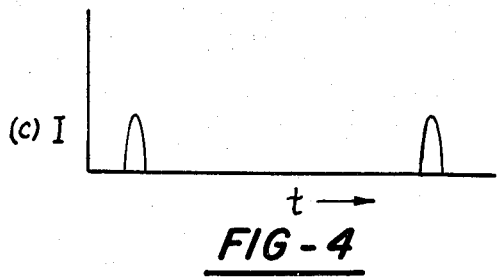

Other objects, features and advantages of the present invention will become apparent in connection with the following description, the appended claims and the accompanying drawings in which:

FIG. 1 is a circuit diagram of the regulated rectifier of the present invention for charging a battery from a permanent magnet alternator; and FIGS. 2, 3 and 4 are waveforms useful in understanding the operation of the regulated rectifier of FIG. 1.

A permanent magnet alternator designated generally at 10 comprises a plurality of permanent magnets 12 carried on the periphery of the rotor 14 and operatively associated with an alternator winding 16. In the preferred embodiment for small engines, rotor 14 is conveniently the flywheel. Winding 16 is connected directly through a full-wave rectifier bridge 18 to battery 20 so that the bridge acts as a series controller. Battery 20 supplies a load 21. Bridge 18 is controlled by a triggering circuit designated generally at 22 which in turn is under the control of the sensing circuit 24 that monitors the voltage at battery 20. When the battery voltage drops below a predetermined level, the bridge is turned on to connect the output of winding 16 to battery 20 and charge the battery.

More particularly, winding 16 is connected across opposite input terminals 30, 32 of bridge 18, and battery 20 is connected directly across output terminals 34, 36 (ground). Diode rectifiers 38, 40 and silicon controlled rectifiers 42, 44 are arranged in the four respective arms of the bridge as shown so that when rectifiers 42, 44 are turned on one half cycle of the voltage at winding 16 is applied to battery 20 through rectifier 38 and controlled rectifier 44 and the opposite half cycle is alternately applied through diode rectifier 40 and controlled rectifier 42.

The triggering circuit 22 generally comprises a pair of identical resistors 50, 52 connected in series with each other as a voltage divider across the input terminals 30, 32 of bridge 18. The midpoint 54 of the voltage divider formed by resistors 50, 52 is connected via a lead 56 and a resistor 58 to the positive terminal 60 of battery 20. Terminal 54 of the voltage divider formed by resistors 50, 52 is also connected to the gates of controlled rectifiers 42, 44 through lead 56, the emitter-collector of a transistor 62 and respective isolating diodes 63, 64. The base of transistor 62 is connected to ground through bias resistors 66, 68. A transistor 70 in the sensing circuit 42 has its emitter-collector connected between the positive battery terminal 60 and the juncture of resistors 66, 68. The base of transistor 70 is connected through a Zener diode 72 to the wiper 73 of a potentiometer 74 which in turn is connected directly across battery 20.

In general, when the voltage at battery 20 is at or above a preselected level of approximately 14.4 volts, the voltage at wiper 73 (i.e., the emitter-base voltage at transistor 70) is sufficient to break Zener diode 72 down in the reverse direction so that base current is supplied to transistor 70 and the transistor is rendered conductive. Ignoring for the moment the effect of current from bridge 18 through resistor 58, when transistor 70 is conducting the base of transistor 62 is substantially at the potential of the emitter and transistor 62 is nonconducting. With transistor 62 nonconducting, no gate current is supplied to the controlled rectifiers 42, 44. Hence bridge 18 is an open circuit and no charging current is supplied to battery 20.

When the battery voltage drops below a preset level of say 14.0 volts, Zener diode 72 becomes nonconducting to turn transistor 70 off. Again ignoring the effect of current from bridge 18 through resistor 58, when transistor 70 is off transistor 62 is forward biased by the emitter-base current from battery 20 through resistors 58, 66, 68. Hence, assuming that the voltage across the winding 16 is at the polarity indicated in FIG. 1, gate current is fed to controlled rectifier 44 via resistor 50, lead 56, transistor 62 and diode 64. Rectifier 44 is forward biased at its anode-cathode and hence completes the charging circuit to battery 20. Similarly, on the opposite half cycle of the alternator voltage, rectifier 42 is turned on by positive gating current through resistor 52, lead 56, transistor 62 and diode 63. As will later be described in greater detail, the connection of resistor 58 between terminals 34 and 54 assures that rectifiers 42, 44 will not be gated on if the voltage across the winding 16 exceeds twice the voltage across battery 20. Charging of battery 20 will continue on alternate half cycles of the alternator voltage until the battery is fully charged. When the battery reaches 14.4 volts, diode 72 breaks down to render transistor 70 conducting which turns transistor 62 off to disconnect the gates of rectifiers 42, 44 from the terminal 54.

Referring to the operation in greater detail, with the battery fully charged at say 14.4 volts, Zener diode 72 will break down, rendering transistor 70 conducting and transistor 62 nonconducting as indicated in FIG. 2 at the time $t_o$. Since the controlled rectifiers 42, 44 are off, no current (I, FIG. 2c) will be supplied to battery 20 as the alternator voltage ($V_a$) swings between positive and negative peaks (FIG. 2a). While rectifiers 42, 44 are off, one half the alternator voltage is developed across each of the respective voltage divider resistors 50, 52.

Similarly, one half of the alternator voltage appearing across the respective resistors 50, 52 will also be applied across the series circuit of resistor 58 and one of the respective diodes 38, 40. As illustrated in FIG. 3, as soon as the alternator voltage $V_a$ at winding 16 starts to increase in either direction depending on the polarity at winding 16, one or the other of the diodes 38, 40 will start to conduct and current flows through resistor 58 in a direction that tends to reverse bias transistor 62. For the polarity at winding 16 shown in FIG. 1, as the alternator voltage $V_a$ (FIG. 3) starts to increase, diode 38 will start to conduct, and the emitter-base bias $e_{58}$ (FIG. 3) starts to increase in a negative direction further increasing the reverse bias at transistor 62. As soon as diode 38 starts to conduct, terminal 30 of bridge 18 will be substantially at the voltage of the positive terminal 60 of the battery 20. As shown in FIG. 3, when the alternator voltage $V_a$ reaches twice the battery voltage $2E_b$, the emitter of transistor 62 ($e_{58}$) will go below ground, negative relative to the battery. It should be understood that the waveforms are intended to be illustrative only since the precise shape of the waveforms will depend upon the values of the circuit parameters and the voltage-current characteristics of diodes 38, 40. Resistor 58 is quite large relative to resistors 50, 52 so that substantially one half of the alternator voltage is developed across resistor 58. During the opposite half cycle at winding 16, the current through diode 40 and resistor 50 will again cause the emitter of transistor 62 to be reversely biased and eventually go below ground when the alternator voltage reaches twice the battery voltage.

As the charge on battery 20 is depleted by the load 21, the battery voltage will gradually drop off, for example, as indicated by the battery voltage waveform $E_b$ dropping from 14.4 volts to 14.0 volts during the time period $t_0$ to $t_1$. Wiper 73 is set so that Zener diode 72 stops conducting when the battery voltage reaches 14.0 volts to thereby render transistor 70 nonconducting. Ignoring for the moment the effect of the current through resistor 58 and diodes 38, 40, transistor 62 is then rendered conductive by emitter-base current through battery 20, resistors 58, 66 and 68. Transistor 62 will supply positive gating current to the controlled rectifiers 42, 44 as the voltage across the respective resistors 50, 52 increases with increasing alternator voltage. For the polarity at winding 16 shown in FIG. 1, as soon as the alternator voltage exceeds the voltage at battery 20 (approximately 14 volts plus the drops across diode 38 and rectifier 44), rectifier 44 will start to conduct completing the battery charging circuit from winding 16 through diode 38, battery 20 and rectifier 44, as indicated by the first half cycle of charging current $i_1$ in FIG. 2. Once controlled rectifier 44 has turned on, it will remain conducting during the remainder of the half cycle $i_1$ regardless of the state of conduction of transistor 62. On the opposite half cycle of voltage across the winding 16, as soon as the alternator voltage increases to just slightly above the voltage at battery 20, controlled rectifier 42 will conduct to supply a second half cycle of charging current $i_2$ to the battery 20; i.e., from the terminal 32 through diode 40, battery 20 and rectifier 42. Once rectifier 42 is rendered conductive, the full half cycle charging current will be delivered to battery 20. For simplicity, it is assumed that battery 20 is fully recharged by two half cycles of charging current in the time $t_1$ to $t_2$. When the battery voltage reaches 14.4 volts at time $t_2$, diode 72 breaks down to cause gate current to be removed from rectifiers 42, 44.

The alternator voltage $V_a$, the battery voltage $E_b$ and the charging current I shown in FIGS. 2a, 2b, 2c, respectively, are intended to be exemplary only. The relative times between periodic charging as well as the number of half cycles during each charging interval will vary depending upon the parameters of the circuit including the load on the battery and the alternator output at the windings 16. Hence although the charging current I is illustrated as consisting of only two half cycles $i_1$, $i_2$, it will be understood that with a higher load or with a lower alternator output, there may be a larger number of half cycles during each charging interval. FIG. 4 illustrates charging current I for various different loads. The charging current at partial load is shown in FIG. 4a where full charge is first restored by two half cycles. Then as the voltage drops off to a second charging point, full charge is restored by one half cycle; and then a third charging interval requires two half cycles. FIG. 4b illustrates the charging current at almost full load where full charge is first restored by five half cycles; and then complete discharge occurs over a time interval corresponding to approximately one half cycle, at which point charging is reinitiated. FIG. 4c shows charging current for a light load where full charge is restored in one half cycle of alternator current with a long time interval before the battery discharges, and then full charge is again restored by one half cycle of charging current.

From the description heretofore, it will be apparent that transistor 62 will not turn on after the alternator voltage reaches twice the battery voltage. At this alternator voltage and above, the drop across resistor 58 due to current flow through resistor 58 drives the emitter of transistor 62 below ground. In practice, the relative values of resistors 58, 66 and 68 may be selected so that the emitter-base of transistor 62 will be reverse biased at an alternator voltage substantially less than 28.8 volts but above 14.4 volts. Hence if transistor 62 is turned on when the alternator voltage exceeds 28.8 volts during one half cycle, the bridge will not turn on until the beginning of the next half cycle. This protective feature avoids current surges in the anode-cathode circuit and the gates of the controlled rectifiers 42, 44 and at transistor 62 which in turn lowers power and heat dissipation requirements for transistor 62 and rectifiers 42, 44.

The regulated rectifier described hereinabove provides several other important advantages. With the controlled rectifiers 42, 44 connected in conjugate arms as shown, their anodes are both at ground potential and hence can be in electrical and thermal contact with a common grounded heat sink for maximum heat transfer and circuit simplicity. The circuit provides very precise regulation. Changes in the battery voltage between no load and full load can be held to less than about one percent. This is achieved by using a Zener diode 72 having a very sharp knee characteristic. On the other hand, the regulation voltage can increase slightly with increasing electrical loads to compensate for resistance drops in the battery and in the electrical wiring. The circuit is a very simple configuration and does not use expensive components such as transformers or the like. This also allows the entire regulated rectifier to be packaged as an integrated circuit with input terminals 30, 32 for connection to winding 16 and output terminals for connection to battery 20.

Improper connection of the battery will not damage the regulator, even when the engine is running. Electrical loads are protected against damage from over-voltage in case of loose battery connections. No output current will pass through bridge 18 unless the battery is connected because transistor 62 receives its forward bias only from the battery 20 and not from the alternator winding 16. On the other hand, battery 20 is required only to supply forward bias to the transistor 62. The gates of the controlled rectifiers are driven by the alternator current (via transistor 62) and hence the rectifiers do not draw current from battery 20. Additionally, when the engine is not operating, the regulated rectifier draws only a small current from the battery, typically about 1.5 milliamps even when transistor 62 is turned on.

By way of example and not limitation, in one regulated rectifier for use with a 15 amp permanent magnet alternator, the following circuit components provided effective operation: Resistors 50, 52–220 ohms (2 watts); resistor 58–12k ohms (½ watt); resistors 66, 68–2.2k ohms (½ watt); potentiometer 74–carbon trimmer, 50k ohms; transistors 62, 70–PNP silicon (type reference: 2N4248); Zener diode 72–6.8 volt Zener diode; diodes 63, 64–100 milliwatt, 100 volt, silicon; diodes 38, 40–5 amp, 100 volt, silicon; SCR's 42, 44–5 amp ave., 100 volt, silicon.

It will be understood that the regulated rectifier has been described hereinabove for purposes of illustration and is not intended to indicate limits of the present invention, the scope of which is defined by the following claims.

I claim:

1. In combination, a permanent magnet alternator, a battery and a regulated rectifier circuit connected between said alternator and said battery to maintain said battery charged at substantially a predetermined level, said alternator comprising at least one permanent magnet carried on a rotor and operatively associated with an output coil to generate an electrical signal in said coil in response to rotation of said magnet past said coil, said regulated rectifier circuit comprising a full-wave rectifier bridge, a battery voltage monitoring circuit and a triggering circuit actuated by said monitoring circuit and operable to control conduction through said bridge, said bridge comprising two diode rectifiers and two controlled rectifiers each of which has a control input, said controlled rectifiers being connected in conjugant arms of said bridge with anodes of said controlled rectifiers connected together at one output terminal of said bridge, said diode rectifiers being connected in another pair of conjugant arms of said bridge with their cathodes connected together at the other output terminal of said bridge, the remaining pair of terminals of said bridge being connected directly across said alternator output coil, said output terminals being connected directly across said battery, said triggering circuit means comprising a first resistor and a second resistor connected in series with each other across said bridge input terminals, a third resistor connected between said other bridge output terminal and the juncture between said first and second resistors, a first electronic switch means having a pair of main electrodes and a control electrode for controlling conduction through said main electrodes, one of said main electrodes of said first switch means being connected to said juncture between said first and second resistors and the other of said main electrodes of said first switch means being connected to said control inputs of said first and said second controlled rectifiers, a fourth resistor connected between said one output terminal and said control electrode of said first switch means, and wherein said voltage monitoring circuit comprises second electronic switch means having a pair of main electrodes and a control electrode, one of said main electrodes of said second switch means being connected to said control electrode of said first switch means and the other main electrode of said second switch means being connected to said other output terminal, fifth impedance means connected directly across said battery to develop a control signal that varies proportionally to the voltage of said battery, and a breakdown device connected between said fifth impedance means and said control electrode of said second switch means and responsive to a predetermined voltage level at said fifth impedance means to initiate conduction of said second switch means.

2. The combination set forth in claim 1 wherein said battery has a positive terminal connected to said other output terminal of said bridge, said battery has a negative terminal connected to said one output terminal of said bridge, said one output terminal of said bridge being at ground potential, and wherein said anodes of said controlled rectifiers are in electrical and thermal contact with a common grounded heat sink.

3. A rectifier circuit for charging a battery from a source of alternating current that varies in peak amplitude comprising first and second input terminals adapted to be connected to said source, first and second output terminals adapted to be connected to said battery, controlled switching means connected between said input and said output terminals to control charging current from said source to said battery, said controlled switching means including at least one controlled rectifier having a control electrode responsive to triggering signals to control conduction therethrough, voltage monitoring circuit means connected across said output terminals and adapted to switch to a first state when the battery is at a first condition of charge and to a second state when the battery is at a second charge condition, and triggering circuit means coupled to said monitoring circuit and to at least one of said input terminals and responsive to switching of said monitoring circuit means from one of said states to the other of said states to develop said triggering signals from said alternating current, said triggering circuit means including a first electronic switch means having a pair of main electrodes and a control input for controlling conduction through said main electrodes, said control input being coupled to said voltage monitoring circuit means, one of said main electrodes being connected to said control electrode and the other of said main electrodes being connected to said one input terminal so that triggering signals for said controlled rectifier can be derived from said source in response to the charge condition at said battery, and wherein said switching means comprises a full-wave rectifier bridge having four conducting arms each of which includes a respective rectifier, a first one of said rectifiers in a first arm is said controlled rectifier, a second one of said rectifiers is a second controlled rectifier having a control electrode and being disposed in a second arm conjugate to said first arm, said output terminals are a pair of opposite terminals of said bridge with the juncture of said first and second arms being one of said output terminals, the remaining two arms of said bridge each include a respective diode rectifier with the juncture therebetween being the other of said output terminals, and wherein said input terminals are the other pair of opposite terminals of said bridge, said juncture between said first and said second arms comprises an electrical ground, said controlled rectifiers each have an anode and a cathode, and said anodes of both controlled rectifiers are connected directly to said electrical ground.

4. The rectifier circuit set forth in claim 3 wherein said one main electrode is connected to said control electrode by a first direct electrical connection and wherein said other main electrode is connected to said one input terminal by a second direct electrical connection.

5. The rectifier circuit set forth in claim 3 wherein said battery has a positive terminal connected to said other output terminal of said bridge, said battery has a negative terminal connected to said one output terminal of said bridge, and wherein said one output terminal of said bridge and said negative terminal of said battery are grounded.

6. The rectifier circuit set forth in claim 5 wherein said anodes of said first and second controlled rectifiers are in electrical and thermal contact with a common grounded heat sink.

7. A rectifier circuit for charging a battery from a source of alternating current comprising a pair of input terminals adapted to be connected to said source, a pair of output terminals adapted to be connected to said battery, switching means connected between said input and said output terminals to control charging current from said source to said battery, said switching means including at least one controlled rectifier having a control electrode responsive to a triggering signal to control conduction therethrough, voltage monitoring circuit means connected across said output terminals and adapted to switch to a first state when the battery is at a first condition of charge and to a second state when the battery is at a second charge condition, and triggering circuit means coupled to said monitoring circuit and to at least one of said input terminals and responsive to switching of said monitoring circuit means from one of said states to the other of said states to provide said triggering signal to said controlled rectifier, said triggering circuit means including a first electronic switch means having a main current conducting path and a control input for controlling conduction through said main path, said control input being coupled to said voltage monitoring circuit means, said main current conducting path being coupled between one of said input terminals and said control electrode of said controlled rectifier so that triggering signals for said controlled rectifier can be derived from said source in response to the charge condition at said battery, and wherein said triggering circuit means include protective circuit means coupled between one of said input terminals and one of said output terminals and electrically connected to said control input of said first switch means and responsive to a predetermined amplitude of said alternating current from said source to prevent conduction through said main current conducting path of said first switch means.

8. The rectifier circuit set forth in claim 7 wherein said battery has a predetermined maximum voltage when charged and wherein said protection circuit comprises a first direct current bias means responsive to alternating current from said source to develop a reverse bias at said switch means that increase with increasing amplitudes of said alternating current and disables said first switch means when said alternating current is substantially greater than said predetermined maximum battery voltage to thereby prevent development of triggering signals at said triggering circuit means.

9. The rectifier circuit set forth in claim 8 wherein said triggering circuit means further comprises second direct current bias means for said first switch means operatively coupled to said output terminals so as to provide a forward bias to said first switch means that renders said first switch means operable to develop said triggering signals from said alternating current in response to electrical energy from said battery when said battery is connected across said output terminals at a predetermined polarity, said monitoring circuit being coupled in said second bias means to disable said switch means when said battery is disconnected from said output terminals or is connected to said output terminals at an opposite polarity so that said first switch means is maintained disabled to prevent development of said triggering signals from said alternating current.

10. The rectifier circuit set forth in claim 9 wherein said first direct current bias means comprises a diode rectifier and a resistor connected in series across said input terminals and wherein said resistor has a value such that reverse bias disables said first switch means when said predetermined level of alternating current is approximately at least twice said predetermined battery voltage.

11. The rectifier circuit set forth in claim 8 wherein said switching means comprises a rectifier bridge having four conducting arms at least one of which includes said controlled rectifier and another of which includes a second rectifier, and wherein said first direct current bias means comprises a resistor connected across said input terminals through said second rectifier.

12. The rectifier circuit set forth in claim 8 wherein said one main electrode is connected to said control electrode by a first direct electrical connection and wherein said other main electrode is connected to said one input terminal by a second direct electrical connection.

13. The rectifier circuit set forth in claim 7 wherein said protective circuit means comprises first resistive impedance means having first and second terminals, said first terminal is electrically connected to one of said output terminals and said second terminal is electrically connected to at least one of said input terminals and wherein said current conducting path of said first switch means includes first and second main electrodes of said switch means, one of said main electrodes is connected to said second terminal of said first resistive impedance means and wherein said monitoring circuit means includes second electronic switch means for connecting said control input of said first switch means to said other output terminal.

14. In combination, permanent magnet generator means for generating an alternating current whose frequency and amplitude vary as a function of the speed of said generator, a battery, and a regulated rectifier circuit connected between said generator means and said battery to maintain said battery at a predetermined charge corresponding to a predetermined voltage, said regulated rectifier circuit comprising at least one controlled rectifier having a control electrode responsive to triggering signals to control conduction therethrough and thereby connect and disconnect said battery to and from said source, triggering circuit means responsive to a control signal for generating said triggering signals from said alternating current, the triggering circuit means including electronic switching means having a pair of output terminals and a pair of input terminals for controlling conduction through said output terminals, and voltage monitoring circuit means responsive to voltage across said battery and operative to generate said control signal when said battery voltage drops below said predetermined voltage, and wherein said triggering circuit means further comprises protection circuit means operative when said battery is connected in circuit with said rectifier and responsive to a predetermined level of said alternating current generated by said generator means to disable said triggering circuit means and thereby prevent generation of said triggering signals independent of said battery charge so long as said alternating current exceeds said predetermined level, said protection circuit means comprising a diode rectifier and a resistor connected in series across said alternator, said resistor being connected in circuit with said input terminals of said electronic switching means to develop a reverse bias at said input terminals and said resistor having an impedance value such that said reverse bias maintains said electronic switching means disabled when said alternating current exceeds said predetermined level, said predetermined level being substantially greater than said predetermined battery voltage but yet sufficiently low to protect said controlled rectifier and other electronic components in said switching means and in said triggering circuit means.

15. The combination set forth in claim 14 wherein one of said output terminals of said electronic switching means is electrically connected directly to said control electrode of said controlled rectifier and the other output terminal of said electronic switching means is electrically connected directly to an output terminal of said generator means.

16. The combination set forth in claim 14 wherein said controlled rectifier is connected in one arm of a bridge circuit and said diode rectifier is connected in another arm of said bridge circuit.

17. A rectifier circuit for charging a battery from a source of alternating current that varies in peak amplitude comprising first and second input terminals adapted to be connected to said source, first and second output terminals adapted to be connected to said battery, controlled switching means connected between said input and said output terminals to control charging current from said source to said battery, said controlled switching means including at least one controlled rectifier having a control electrode responsive to triggering signals to control conduction therethrough, voltage monitoring circuit means connected across said output terminals and adapted to switch to a first state when the battery is at a first condition of charge and to a second state when the battery is at a second charge condition, and triggering circuit means coupled to said monitoring circuit and to at least one of said input terminals and responsive to switching of said monitoring circuit means from one of said states to the other of said states to develop said triggering signals from said alternating current, said triggering circuit means including a first electronic switch means having a pair of main electrodes and a control input for controlling conduction through said main electrodes, said control input being coupled to said voltage monitoring circuit means, one of said main electrodes being connected to said control electrode by a first direct electrical connection and the other of said main electrodes being connected to said one input terminal by a second direct electrical connection so that triggering signals for said controlled rectifier can be derived from said source in response to the charge condition at said battery, and wherein said second direct electrical connection comprises a voltage divider having a pair of end terminals and an intermediate terminal electrically between said end terminals, one of said end terminals is connected to one of said input terminals and the other of said end terminals is connected to the other of said input terminals and wherein said one main electrode is connected to said intermediate terminal so that said triggering signals are of substantially the same phase and frequency as said alternating current.

18. The rectifier circuit set forth in claim 17 wherein one of said direct electrical connections includes a diode rectifier.

19. The rectifier circuit set forth in claim 17 wherein said first direct electrical connection includes a diode rectifier connected between said one main electrode of said switch means and said control electrode of said controlled rectifier.

20. The rectifier circuit set forth in claim 17 wherein said voltage divider comprises resistive impedance means.

21. The rectifier circuit set forth in claim 17 wherein said triggering circuit means further comprises second resistive impedance means, one terminal of which is connected to one of said output terminals of said bridge and the other terminal of which is connected to said one main electrode of said first switch means and to said intermediate terminal of said voltage divider.

22. The rectifier circuit set forth in claim 21 wherein said control input of said first switch means is connected through a third resistive impedance means to the other of said bridge output terminals and wherein said voltage monitoring circuit means includes a second electronic switch means having a pair of main electrodes one of which is connected to the juncture between said control input of said first switch means and said third resistive impedance means and the other of which is connected to said one output terminal so that when said second switch means switches to one of said states said control input of said first switch means is electrically connected to said one output terminal through said third switch means.

23. A rectifier circuit for charging a battery from a source of alternating current that varies in peak amplitude comprising first and second input terminals adapted to be connected to said source, first and second output terminals adapted to be connected to said battery, controlled switching means connected between said input and said output terminals to control charging current from said source to said battery, said controlled switching means including at least first and second controlled rectifiers having a common anode connection and each of which has a control electrode responsive to triggering signals to control conduction therethrough, said triggering signals being of substantially the same phase and frequency as said alternating current, said first and second controlled rectifiers being arranged to conduct on opposite half cycles of said alternating current, voltage monitoring circuit means connected across said output terminals and adapted to switch to a first state when the battery is at a first condition of charge and to a second state when the battery is at a second charge condition, and triggering circuit means coupled to said monitoring circuit and to said input terminals and responsive to switching of said monitoring circuit means from one of said states to the other of said states to develop said triggering signals from said alternating current source, said triggering circuit means including a first electronic switch means having a pair of main electrodes and a control input for controlling conduction through said main electrodes, said control input being coupled to said voltage monitoring circuit means, one of said main electrodes being connected to said control electrodes of said first and second controlled rectifiers by nonreactive direct electrical connections and the other of said main electrodes being connected to said input terminals by direct nonreactive electrical connections so that said triggering signals for said controlled rectifiers are of substantially the same phase and frequency as said alternating current and are derived directly from said source and applied directly through said main electrodes to said control electrodes of said controlled rectifiers in response to the charge condition at said battery.

24. The rectifier circuit set forth in claim 23 wherein at least one of said direct nonreactive electrical connections includes a diode rectifier.

25. The rectifier circuit set forth in claim 24 wherein said diode rectifier is connected in said one direct nonreactive electrical connection between said one main electrode and said control electrode of said first controlled rectifier and wherein a second diode rectifier is connected in the other direct nonreactive electrical connection between said one main electrode and said control electrode of said second controlled rectifier.

26. The rectifier circuit set forth in claim 23 wherein at least one of said direct nonreactive electrical connections includes resistance means.

27. The rectifier circuit set forth in claim 26 wherein said one direct nonreactive electrical connection is between said other main electrode and said first input terminal.

28. The rectifier circuit set forth in claim 26 wherein said resistance means is connected in said one direct nonreactive electrical connection between said other main electrode and said first input terminal and wherein a second resistance means is connected in the other direct nonreactive electrical connection between said other main electrode and said second input terminal.

29. A rectifier circuit for charging a battery from a source of alternating current that varies in peak amplitude comprising:
input terminals adapted to be connected to said source;
first and second output terminals adapted to be connected to said battery;
controlled switching means connected between said input and said output terminals to control charging current from said source to said battery, said controlled switching means including at least two controlled rectifiers having control electrodes responsive to triggering signals to control conduction therethrough and having a common anode connection;
voltage monitoring circuit means connected across said output terminals and adapted to switch to a first state when the battery is at a first condition of charge and to a second state when the battery is at a second charge condition, the voltage monitoring circuit means including a resistive voltage divider circuit between the first and second output terminals, a threshold device coupled to the voltage divider intermediate the first and second output terminals, and a first electronic switch means having a pair of main electrodes and a control input coupled to the voltage divider circuit, one of said states corresponding to conduction by both the threshold device and the first electronic switch means while the other of said states corresponds to nonconduction by both the threshold device and the first electronic switch means; and
triggering circuit means coupled to said monitoring circuit and responsive to switching of said monitoring circuit means from one of said states to the other of said states to develop said triggering signals, said triggering circuit means including a second electronic switch means having a pair of main electrodes and a control input for controlling conduction through said main electrodes, said control input being coupled to said voltage monitoring circuit means, one of said main electrodes being connected to said control electrode by a first electrical connection and the other main electrode being coupled to the alternating current source so that triggering signals for said controlled rectifiers can be derived from the alternating current source in response to the charge condition at said battery, the triggering signals occurring only when the second electronic switch means is conductive between its main electrodes, conduction by the first electronic switch means and the threshold device maintaining the second electronic switch means in a nonconductive state.

30. The rectifier circuit of claim 29 wherein the threshold device forms a series connection between the voltage divider and the first electronic switch means control input, one of the first electronic switch means main electrodes being connected to an output terminal and the other first electronic switch means main electrode being coupled to the second electronic switch means control input.

* * * * *